United States Patent
Chen et al.

(10) Patent No.: US 10,504,209 B2
(45) Date of Patent: Dec. 10, 2019

(54) IMAGE DEHAZING METHOD

(71) Applicant: BEIHANG UNIVERSITY, Beijing (CN)

(72) Inventors: Xiaowu Chen, Beijing (CN); Yafei Song, Beijing (CN); Jia Li, Beijing (CN); Qinping Zhao, Beijing (CN); Xiaogang Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 50 days.

(21) Appl. No.: 15/448,546

(22) Filed: Mar. 2, 2017

(65) Prior Publication Data
US 2018/0018539 A1    Jan. 18, 2018

(30) Foreign Application Priority Data
Jul. 12, 2016   (CN) .......................... 2016 1 0545516

(51) Int. Cl.
*G06T 5/00* (2006.01)
*G06N 3/04* (2006.01)
(Continued)

(52) U.S. Cl.
CPC .......... *G06T 5/001* (2013.01); *G06K 9/00973* (2013.01); *G06N 3/04* (2013.01); *G06N 3/08* (2013.01); *G06T 1/20* (2013.01); *G06K 9/4628* (2013.01); *G06K 9/623* (2013.01); *G06K 9/627* (2013.01); *G06N 3/0454* (2013.01);
(Continued)

(58) Field of Classification Search
None
See application file for complete search history.

(56) References Cited

U.S. PATENT DOCUMENTS

2016/0283841 A1* 9/2016 Sainath ................ G06N 3/0454
2018/0165548 A1* 6/2018 Wang ...................... G06T 7/246

FOREIGN PATENT DOCUMENTS

CN    101916334 A    12/2010
CN    103679211 A    3/2014
(Continued)

OTHER PUBLICATIONS

The Chinese First Examination Report of corresponding China patent application No. 2016105455163, dated Dec. 18, 2018.

*Primary Examiner* — Justin P. Misleh
(74) *Attorney, Agent, or Firm* — J.C. Patents (57) ABSTRACT

Present invention provides a ranking convolutional neural network constructing method and an image processing method and apparatus thereof. The ranking convolutional neural network includes a ranking layer that is configured to sort an output of a previous layer of the ranking layer, generate an output of the ranking layer according to the sorted output, and output the output of the ranking layer to a next layer of the ranking layer. Using the ranking convolutional neural network enables obtaining an output feature corresponding to the input feature image through automatic learning. Compared with prior art methods that obtain features through manual calculation, the method of the present invention is superior in terms of reflecting the objective laws contained by the patterns of the actual scene. When applied to the field of image processing, the method can significantly improve the effect of image processing.

5 Claims, 6 Drawing Sheets

(51) Int. Cl.
  *G06N 3/08* (2006.01)
  *G06T 1/20* (2006.01)
  *G06K 9/00* (2006.01)
  *G06K 9/46* (2006.01)
  *G06K 9/62* (2006.01)
  *G06N 5/00* (2006.01)
  *G06N 20/20* (2019.01)

(52) U.S. Cl.
  CPC ............ *G06N 3/084* (2013.01); *G06N 5/003* (2013.01); *G06N 20/20* (2019.01); *G06T 2200/28* (2013.01); *G06T 2207/10024* (2013.01); *G06T 2207/20081* (2013.01); *G06T 2207/20084* (2013.01); *G06T 2207/30192* (2013.01)

(56) References Cited

FOREIGN PATENT DOCUMENTS

| | | |
|---|---|---|
| CN | 103902972 A | 7/2014 |
| CN | 104217404 A | 12/2014 |
| CN | 104504658 A | 4/2015 |
| CN | 105528516 A | 4/2016 |
| CN | 105719247 A | 6/2016 |
| CN | 106156781 B | 9/2019 |

* cited by examiner

IMAGE DEHAZING METHOD

CROSS-REFERENCE TO RELATED APPLICATIONS

This application claims priority to Chinese Patent Application No. 201610545516.3, filed on Jul. 12, 2016, which is hereby incorporated by reference in its entirety.

TECHNICAL FIELD

The present invention relates to image processing technology, and particularly, to a ranking convolutional neural network constructing method and an image processing method and apparatus thereof.

BACKGROUND

In the field of image processing, it is desired to process some sub-optimally presented images to obtain better presented images. For example, a hazy image, i.e. an image captured in hazy environment, needs to be processed to obtain a clear image.

In the prior art, the hazy image processing begins from manual calculation to obtain features related to the haze. Then recovers the hazy image to a clear image according to the manually calculated features.

However, in such a method of obtaining features related to the haze by manual calculation, it is difficult to reflect the objective laws contained by the patterns of the actual scene, which leading to a poor effect of image processing.

SUMMARY

Accordingly, the present invention provides a ranking convolutional neural network constructing method, and an image processing method and apparatus thereof.

In a first aspect, the present invention provides a ranking convolutional neural network constructing method, where the ranking convolutional neural network includes a ranking layer, a convolution layer, a downsampling layer and a fully-connecting layer, and the ranking layer is configured to rank an output of a previous layer of the ranking layer, generate an output of the ranking layer according to the ranked output, and output the output of the ranking layer to a next layer of the ranking layer, the method including:

receiving an input feature image, the input feature image is represented by a two dimensional matrix;

performing a ranking operation, a convolution operation, a downsampling operation, and a fully-connecting operation to the input feature image, according to a preset order of the ranking layer, the convolution layer, the downsampling layer and the fully-connecting layer in the ranking convolutional neural network, to obtain an output feature corresponding to the input feature image, where the output feature is a feature vector, the ranking operation is performed in the ranking layer, the convolution operation is performed in the convolution layer, the downsampling operation is performed in the downsampling layer, and the fully-connecting operation is performed in the fully-connecting layer; and outputting the output feature.

Furthermore, the ranking operation being performed in the ranking layer, includes:

receiving a first feature image output from the previous layer of the ranking layer, where the first feature image is represented by a two dimensional matrix;

sorting all elements in the first feature image;

writing each element in the first feature image one-by-one into a second feature image according to a sorted result; and outputting the second feature image to the next layer of the ranking layer.

Furthermore, the ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where a convolution kernel of the second convolution layer is smaller than a convolution kernel of the first convolution layer, and a convolution kernel of the third convolution layer is smaller than the convolution kernel of the first convolution layer.

In a second aspect, the present invention provides an image processing method, including:

receiving an input hazy image;

determining, by using a ranking convolutional neural network, a feature vector for a current pixel of the input hazy image, where the ranking convolutional neural network includes a ranking layer, a convolution layer, a downsampling layer and a fully-connecting layer, the ranking layer is configured to sort an output of a previous layer of the ranking layer, generate an output of the ranking layer according to the sorted output, and output the output of the ranking layer to a next layer of the ranking layer;

inputting the feature vector for the current pixel into a random forest regression model to obtain a haziness for the current pixel; and determining a clear image corresponding to the input hazy image according to the haziness and ambient light information.

Furthermore, before the determining, by using a ranking convolutional neural network, a feature vector for a current pixel of the input hazy image, further including:

establishing correspondence between a feature vector of the output layer and the haziness;

where the correspondence between the feature vector of the output layer and the haziness is: for a feature vector of the output layer $N_B=(n_B^1, n_B^2, L, n_B^m)$, if $t_B \in (i/10-0.1, i/10]$, then $n_B^i=1$, otherwise $n_B^i=0$, wherein $t_B$ is the haziness.

Furthermore, the ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where a convolution kernel of the second convolution layer is smaller than a convolution kernel of the first convolution layer, and a convolution kernel of the third convolution layer is smaller than the convolution kernel of the first convolution layer;

the determining, by using a ranking convolutional neural network, a feature vector for a current pixel of the input hazy image includes:

determining an input feature image for the current pixel through the input layer, where the input feature image is represented by a two dimensional matrix;

performing ranking, convoluting, downsampling and fully-connecting for the input feature image; and taking a feature vector output by the second fully-connecting layer as the feature vector for the current pixel.

Furthermore, the inputting the feature vector for the current pixel into a random forest regression model to obtain a haziness for the current pixel includes:

training a regression tree in the random forest regression model using a preset number of elements selected from the feature vector for the current pixel; obtaining an output value of the random forest regression model; and taking the output value of the random forest regression model as the haziness for the current pixel.

Furthermore, after the determining a clear image corresponding to the input hazy image according to the haziness and ambient light information, further including:

adjusting brightness of the clear image using formula $J^*=\lambda J$, wherein $$\lambda = \log\left(\sum_x I^l(x) \Big/ \sum_x J^l(x)\right) + 1, I^l(x)$$

is brightness of the input hazy image, and $J^l(x)$ is the brightness of the clear image.

In a third aspect, the present invention provides a ranking convolutional neural network constructing apparatus, where the ranking convolutional neural network includes a ranking layer, a convolution layer, a downsampling layer and a fully-connecting layer, and the ranking layer is configured to sort an output of a previous layer of the ranking layer, generate an output of the ranking layer according to the sorted output, and output the output of the ranking layer to a next layer of the ranking layer, the apparatus including:

a receiving module configured to receive an input feature image, the input feature image is represented by a two dimensional matrix;

a processing module configured to perform a ranking operation, a convolution operation, a downsampling operation and a fully-connecting operation to the input feature image, according to a preset order of the ranking layer, the convolution layer, the downsampling layer and the fully-connecting layer in the ranking convolutional neural network to obtain an output feature corresponding to the input feature image, where the output feature is a feature vector, the ranking operation is performed in the ranking layer, the convolution operation is performed in the convolution layer, the downsampling operation is performed in the downsampling layer, and the fully-connecting operation is performed in the fully-connecting layer; and an outputting module configured to output the output feature.

Furthermore, the processing module includes:

a receiving unit configured to receive a first feature image output from the previous layer of the ranking layer, where the first feature image is represented by a two dimensional matrix;

a ranking unit configured to sort all elements in the first feature image;

a writing unit configured to write each element in the first feature image one-by-one into a second feature image according to a sorted result; and an outputting unit configured to output the second feature image to the next layer of the ranking layer.

Furthermore, the ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where a convolution kernel of the second convolution layer is smaller than a convolution kernel of the first convolution layer, and a convolution kernel of the third convolution layer is smaller than the convolution kernel of the first convolution layer.

In a fourth aspect, the present invention provides an image processing apparatus, including:

a receiving module configured to receive an input hazy image;

a first determining module configured to use a ranking convolutional neural network to determine a feature vector for a current pixel of the input hazy image, where the ranking convolutional neural network includes a ranking layer, a convolution layer, a downsampling layer and a fully-connecting layer, the ranking layer is configured to sort an output of a previous layer of the ranking layer, generate an output of the ranking layer according to the sorted output, and output the output of the ranking layer to a next layer of the ranking layer;

an obtaining module configured to input the feature vector for the current pixel into a random forest regression model to obtain a haziness for the current pixel; and a calculating module configured to calculate a clear image corresponding to the input hazy image according to the haziness and ambient light information.

Furthermore, the apparatus further including: an establishing module configured to establish correspondence between a feature vector of the output layer and the haziness, where the correspondence between the feature vector of the output layer and the haziness is: for a feature vector of the output layer $N_B=(n_B^1, n_B^2, L, n_B^m)$, if $t_B \in (i/10-0.1, i/10]$, then $n_B^i=1$, otherwise $n_B^i=0$, where $t_B$ is the haziness.

Furthermore, the ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where a convolution kernel of the second convolution layer is smaller than a convolution kernel of the first convolution layer, and a convolution kernel of the third convolution layer is smaller than the convolution kernel of the first convolution layer. The first determining module includes:

a determining unit configured to determine an input feature image for the current pixel through the input layer, where the input feature image is represented by a two dimensional matrix;

a processing unit configured to perform ranking, convoluting, downsampling and fully-connecting for the input feature image; and an output unit configured to take a feature vector output by the second fully-connecting layer as the feature vector for the current pixel.

Furthermore, the obtaining module is particularly configured to:

train a regression tree in the random forest regression model using a preset number of elements selected from the feature vector for the current pixel; obtain an output value of the random forest regression model; and take the output value of the random forest regression model as the haziness for the current pixel.

Furthermore, the apparatus further including: an adjusting module configured to adjust brightness of the clear image using formula $J^*=\lambda J$, where $$\lambda = \log\left(\sum_x I^l(x) \Big/ \sum_x J^l(x)\right) + 1, I^l(x)$$

is brightness of the input hazy image, and $J^l(x)$ is the brightness of the clear image.

The method provided by the present invention, through constructing a ranking convolutional neural network, the ranking convolutional neural network is capable of obtaining an output feature corresponding to the input feature image through automatic learning. Compared with prior art methods that obtain features through manual calculation, the method of the present invention is superior in terms of reflecting the objective laws contained by the patterns of the actual scene. When applied to the field of image processing, the method can significantly improve the effect of image processing.

BRIEF DESCRIPTION OF DRAWINGS

To describe technical solutions in embodiments of the present invention or the prior art more clearly, the following briefly describes the accompanying drawings required in the description of embodiments or the prior art, apparently, the accompanying drawings illustrate only some exemplary embodiments of the present invention, and those skilled in the art can derive other drawings from these drawings without creative efforts.

DESCRIPTION OF EMBODIMENTS

In order to make objectives, technical solutions and advantages of the present disclosure clearer, the technical solutions in the embodiments of the present disclosure will be described hereunder clearly and completely with reference to accompanying drawings in the embodiments of the present disclosure. Obviously, the described embodiments are only a part of embodiments of the present disclosure, rather than all of them. Any other embodiments obtained by persons skilled in the art based on the embodiments of the present disclosure herein without making any creative effort shall fall into the protection scope of the present disclosure.

Figure 1:
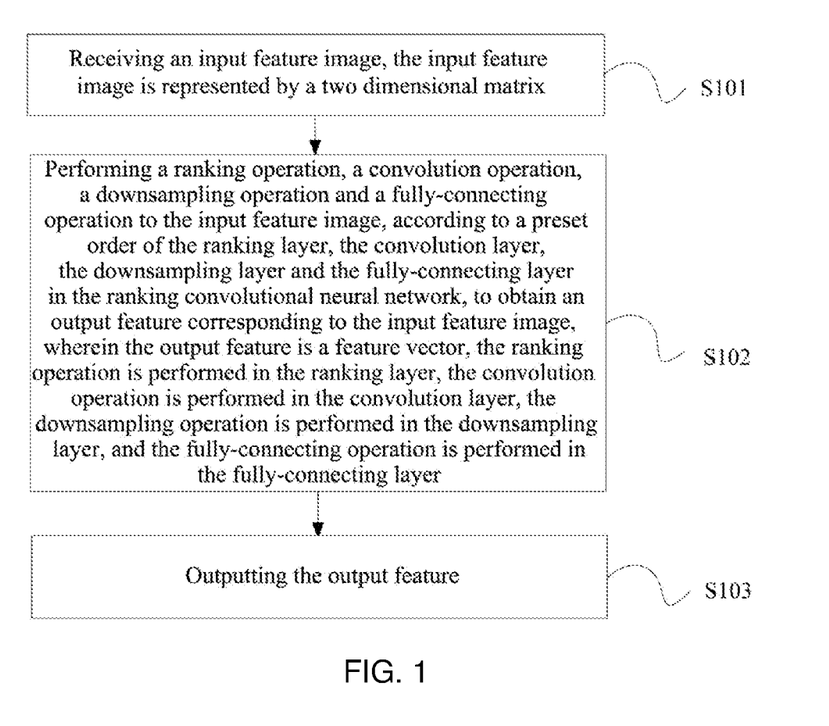
FIG. 1 is a flowchart illustrating a ranking convolutional neural network constructing method according to a first embodiment of the present invention.

FIG. 1 is a flowchart illustrating a ranking convolutional neural network constructing method according to a first embodiment of the present invention. In the method, the ranking convolutional neural network includes: a ranking layer, a convolution layer, a downsampling layer and a fully-connecting layer, where the ranking layer is configured to sort an output of a previous layer of the ranking layer, generate an output of the ranking layer according to the sorted output, and output the output of the ranking layer to a next layer of the ranking layer. As depicted in FIG. 1, the method includes:

S101: receiving an input feature image, the input feature image is represented by a two dimensional matrix.

Under different application scenarios, elements in the input feature image carries different interpretations. For example, when the method is applied to the field of image processing, each element in the input feature image may represent a pixel.

S102: performing a ranking operation, a convolution operation, a downsampling operation and a fully-connecting operation to the input feature image, according to a preset order of the ranking layer, the convolution layer, the downsampling layer and the fully-connecting layer in the ranking convolutional neural network, to obtain an output feature corresponding to the input feature image, wherein the output feature is a feature vector, the ranking operation is performed in the ranking layer, the convolution operation is performed in the convolution layer, the downsampling operation is performed in the downsampling layer, and the fully-connecting operation is performed in the fully-connecting layer.

Architecture of the ranking convolutional neural network may be flexibly arranged according to actual needs. For example, one or more convolution layers may be arranged in the ranking convolutional neural network.

When the ranking convolutional neural network is applied to different sectors, statistical characteristics may provide important implications. Yet in existing convolutional neural network, such statistical characteristics are insufficiently represented. For that respect, the present invention adds the ranking layer on the basis of existing convolutional neural network to form a new ranking convolutional neural network, where the number of the ranking layer may be flexibly arranged according to actual needs. With the ranking layer being added, the ranking convolutional neural network can enhance the capability of the neural network to describe the statistical characteristics, thus performing better at learning features relevant to the field of application.

S103: outputting the output feature.

In the present embodiment, a ranking convolutional neural network constructing method is provided. The constructed ranking convolutional neural network is capable of obtaining an output feature corresponding to the input feature image through automatic learning. Compared with prior art methods that obtain features through manual calculation, the method of the present invention is superior in terms of reflecting the objective laws contained by the patterns of the actual scene. When applied to the field of image processing, the method can significantly improve the effect of image processing. Meanwhile, the present invention adds the ranking layer to the convolutional neural network to form the ranking convolutional neural network, which can enhance the capability of the neural network to describe the statistical characteristics, thus performing better at learning features relevant to the field of application.

Figure 2:
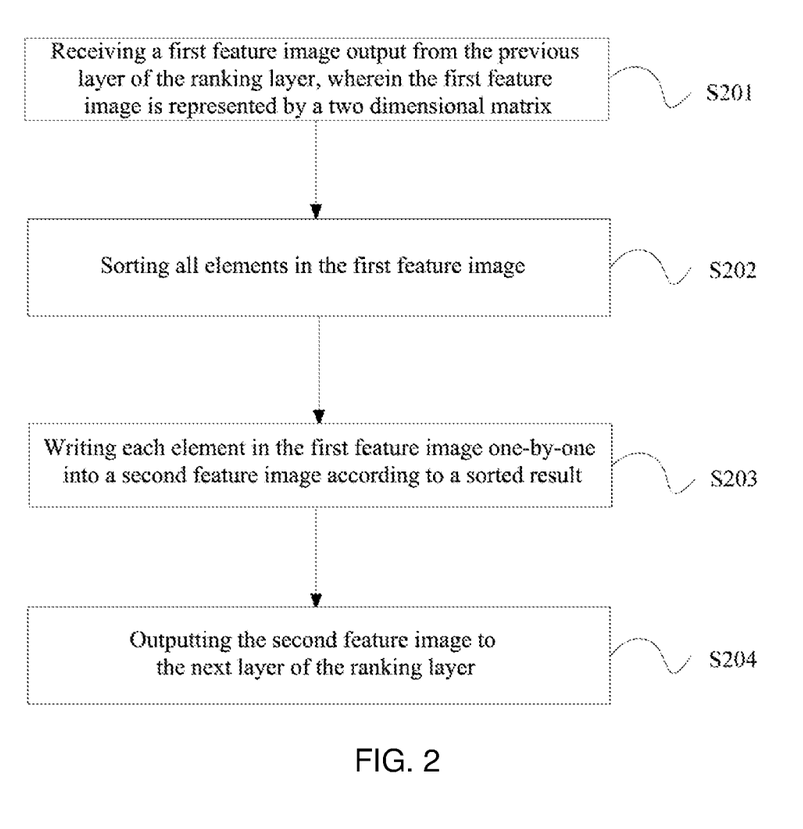
FIG. 2 is a flowchart illustrating a ranking convolutional neural network constructing method according to a second embodiment of the present invention.

On the basis of the aforementioned embodiment, the present embodiment relates to a particular method for the ranking layer to perform the ranking operation. That is, FIG. 2 is a flowchart illustrating a ranking convolutional neural network constructing method according to a second embodiment of the present invention. As depicted in FIG. 2, the particular method for the ranking layer to perform the ranking process includes:

S201: receiving a first feature image output from the previous layer of the ranking layer, wherein the first feature image is represented by a two dimensional matrix.

For example, assuming that the previous layer of the ranking layer is the downsampling layer, then the downsampling layer will output a feature image, i.e. the first feature image, to the ranking layer, where the feature image is represented by a two dimensional matrix.

S202: sorting all elements in the first feature image.

Particularly, elements in the first feature image may be arranged either from the smallest to the largest, or from the largest to the smallest, according to actual needs.

S203: writing each element in the first feature image one-by-one into a second feature image according to a sorted result.

Particularly, the second feature image is the same size as the first feature image. For example, assuming that the first feature image corresponds to a two dimensional matrix of m×n, the second feature image will correspond to a two dimensional matrix of m×n, too. According to a ranking result, each element is written into the second feature image according to a row priority order. That is, the element ranked in the first place of the ranking result is written to the first row and first column of the second feature image, the element ranked in the second place of the ranking result is written to the first row and second column of the second feature image, and so on.

S204: outputting the second feature image to the next layer of the ranking layer.

For example, assuming that the next layer of the ranking layer is a convolution layer, then the second feature image will be outputted to the convolution layer to perform convolution processing.

Figure 3:
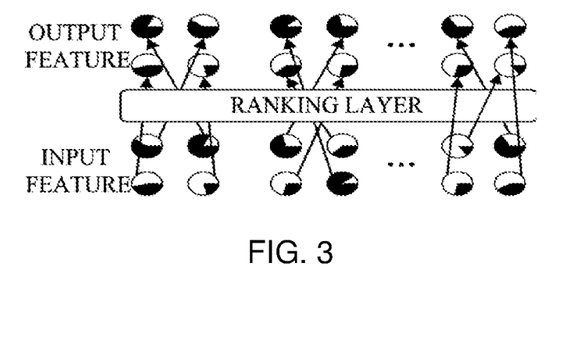
FIG. 3 is a diagram illustrating the ranking layer processing a ranking process.

FIG. 3 is a diagram illustrating the ranking layer processing a ranking process. As depicted in FIG. 3, after a plurality of feature images are processed by the ranking layer, elements therein are rearranged, forming new feature images.

As an alternative implementation for the present invention, the foregoing ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where the output layer is also a fully-connecting layer, a convolution kernel of the second convolution layer is smaller than that of the first convolution layer, and a convolution kernel of the third convolution layer is smaller than that of the first convolution layer. The process of the foregoing step S102, in which the ranking convolutional neural network determines the output feature, is hereunder explained using this 10-layer ranking convolutional neural network as an example. It should be noted that the numbers used in the present example are for illustrating only, rather than limiting the ranking convolutional neural network.

Firstly, 400 clear images are collected, and then 100,000 clear image patches of size 20×20 are randomly captured.

Based on the physics process of the forming of a hazy image and the mathematical description thereof, regarding each clear image patch, and assuming that R, G and B channels of the ambient light are all 1, 10 haziness values are randomly selected, the haze is automatically imposed onto each of the clear image patches. Each of the hazy image patches and their corresponding haziness are recorded, producing 1,000,000 training image patches.

Secondly, the 1,000,000 training image patches are received by the input layer, regarding each training image patch, and three input feature images are outputted by the input layer, which correspond to the R, G and B channels of each of the training image patch respectively. The input feature images are received by the first convolution layer, and performed convolution processing through a convolution kernel of size 5×5, outputting 32 feature images of size 16×16. The 32 feature images of size 16×16 are sampled by the first downsampling layer using 2×2 sampling window, outputting 32 feature images of size 8×8. The 32 feature images of size 8×8 are sorted by the ranking layer, outputting 32 new feature images of size 8×8. The sizes of the convolution kernels of the second convolution layer and the third convolution layer are both 3×3, i.e. a size smaller than that of the first convolution layer. After convolution processing at the second convolution layer and the third convolution layer, 32 feature images of size 4×4 are outputted. After being processing by 2×2 sampling window at the second downsampling layer, 32 feature images of size 2×2 are outputted. After being processing by the first fully-connecting layer and the second fully-connecting layer, which are both fully-connecting layer including 64-dimensional features, one 64-dimension feature vector is outputted. Finally, after the processing of the output layer, one 10-dimension vector is outputted.

Here, the first convolution layer, the second convolution layer, the third convolution layer and the first fully-connecting layer use Rectified linear unit (ReLU) as their activation function. For a given input value x, an activation value for the ReLU activation function is $f(x)=\max(x,0)$.

The present invention trains the defined ranking convolutional neural network by using backpropagation gradient descent algorithm, and the Softmax loss function is also adopted. The Softmax loss function is defines as $$L(N_B, Y_B) = -\log\left(e^{y_B^j} \Big/ \sum_{i=1}^{10} e^{y_B^i}\right),$$

where $N_B$ is a actual class label of the training sample, $Y_B$ is a prediction of the neural network, and j corresponds to $n_B^j=1$. It should be further noted that, while the ranking network back-propagates the gradient according to the results of forward-propagation.

Thirdly, after the foregoing two steps, the ranking convolutional neural network training has completed a first run, and the output feature vector from the output layer at the end of this run is interpreted as haziness. The difference between this haziness and the haziness value recorded at the first step is used as the basis to tune the element value of the convolution kernel of each convolution layer, as well as the feature matrix of each fully-connecting layer, in the ranking convolutional neural network. The new convolution kernel and feature matrix are then used for the next run of training. This process continues until the deviation of an output feature value of a certain training run from the haziness value recorded at the first step is within a desired range, thus completing the construction of the ranking convolutional neural network.

Figure 4:
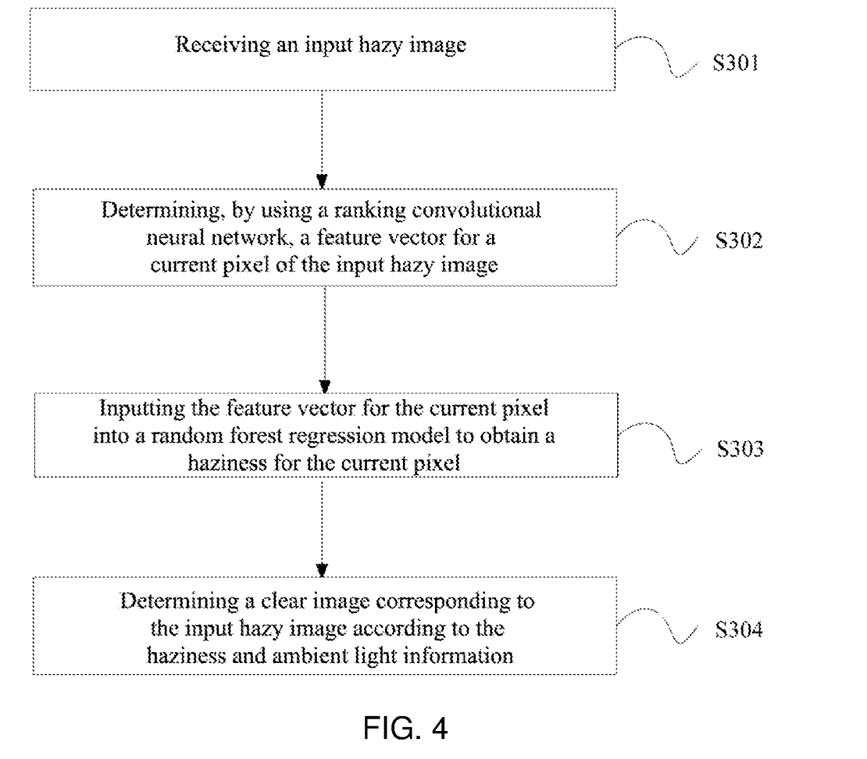
FIG. 4 is a flowchart illustrating an image processing method according to a first embodiment of the present invention.

FIG. 4 is a flowchart illustrating an image processing method according to a first embodiment of the present invention. As depicted in FIG. 4, the method includes:

S301: receiving an input hazy image.

The input hazy image is an image captured in hazy environment.

S302: determining, by using a ranking convolutional neural network, a feature vector for a current pixel of the input hazy image.

Here, the ranking convolutional neural network includes a ranking layer, a convolution layer, a downsampling layer and a fully-connecting layer, where the ranking layer is configured to sort an output of a previous layer of the ranking layer, generate an output of the ranking layer according to the sorted output, and output the output of the ranking layer to a next layer of the ranking layer.

It should be noted that, the steps S302 to S304 need to be performed for each pixel in an input hazy image. That is, the process of the present invention is performed on a pixel-to-pixel basis for the input hazy image.

S303: inputting the feature vector for the current pixel into a random forest regression model to obtain a haziness for the current pixel.

The random forest regression model is intended to reveal the mapping between the feature vector and the haziness. That is, a haziness corresponding to a specific feature vector can be obtained by training in the random forest regression model.

Preferably, the haziness obtained through the random forest regression model is optimized with guided filtering.

S304: determining a clear image corresponding to the input hazy image according to the haziness and ambient light information.

Although haziness of individual pixels in an input hazy image may vary, the ambient light shall remain consistent over the entire hazy image, and hence may be readily available through estimation. Optionally, dark channel of the input hazy image is firstly calculated. Based on the dark channel value of each pixel, the top 0.1% of the brightest pixels are selected, and the average color value of these pixels is taken as the ambient light of the input hazy image.

In the present embodiment, a feature vector is obtained from the input hazy image through the ranking convolutional neural network, and a haziness corresponding to the feature vector is determined through the random forest regression model. Since the ranking convolutional neural network can automatically learn the feature of the input hazy image, the objective laws contained by the patterns of the actual scene may be more objectively reflected, significantly improving the effect of hazy image processing.

As an alternative implementation for the above mentioned ranking convolutional neural network, an ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where the output layer is also a fully-connecting layer, a convolution kernel of the second convolution layer is smaller than a convolution kernel of the first convolution layer, and a convolution kernel of the third convolution layer is smaller than the convolution kernel of the first convolution layer.

Figure 5:
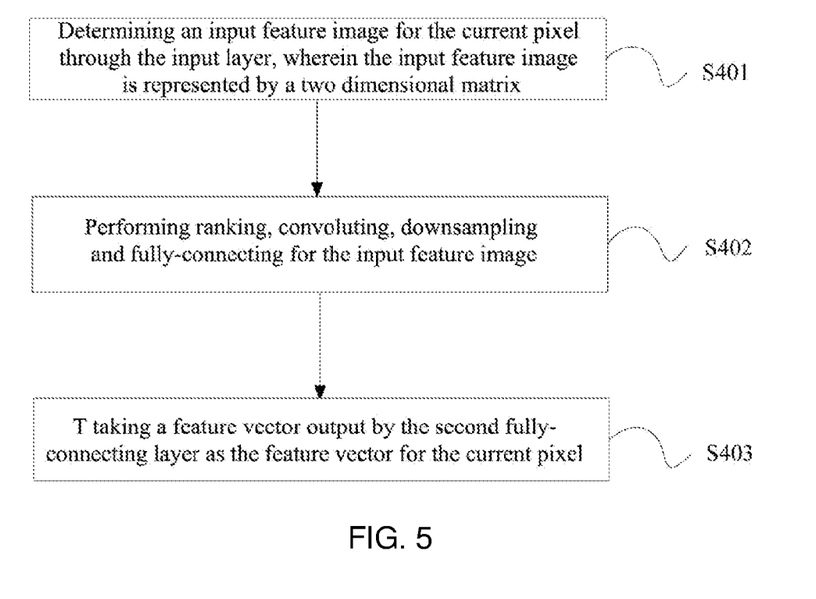
FIG. 5 is a flowchart illustrating an image processing method according to a second embodiment of the present invention.

FIG. 5 is a flowchart illustrating an image processing method according to a second embodiment of the present invention. As depicted in FIG. 5, the method for determining a feature vector from an input hazy image based on the 10-layer ranking convolutional neural network particularly includes:

S401: determining an input feature image for the current pixel through the input layer, wherein the input feature image is represented by a two dimensional matrix.

For each of the three channels included in the current pixel, an input feature image is respectively determined. That is, the method illustrated in the present embodiment is sequentially carried out for each channel of each pixel.

S402: performing ranking, convoluting, downsampling and fully-connecting for the input feature image.

The particular method may be found by referring to related embodiments in the aforementioned ranking convolutional neural network constructing method, which will not be repeated herein.

S403: taking a feature vector output by the second fully-connecting layer as the feature vector for the current pixel.

When training the ranking convolutional neural network, the output from the output layer is a feature vector indicating a haziness. However, if that the output feature vector is directly used as an input for the random forest regression model, which is required in the present disclosure as the next process, training for the random forest regression model will be ineffective. For that consideration, the present invention constructs a 10-class classification problem, so that the haziness values are equally divided into 10 ranges, with each class corresponding to one of the haziness value ranges, and trains the ranking convolutional neural network to determine which range does a haziness belong to. That is, when training the ranking convolutional neural network, a correspondence between the feature vector and the haziness is established, which will be: for a feature vector $N_B=(n_B^1, n_B^2, L, n_B^m)$, if $t_B \in (i/10-0.1, i/10]$, then $n_B^i=1$, otherwise $n_B^i=0$, where $t_B$ is the haziness.

In the present embodiment, after the correspondence between the feature vector and the haziness is established, the feature vector output from the layer previous to the output layer, i.e. the second fully-connecting layer, is taken as the feature vector for the ranking convolutional neural network, and the random forest regression model is trained based on the correspondence between the feature vector and the haziness, thereby obtaining the haziness corresponding to the feature vector.

In another embodiment, the particular approach for the aforementioned S303: the feature vector for the current pixel is used as the input to a random forest regression model to obtain a haziness for the current pixel includes:

train a regression tree in the random forest regression model using a preset number of elements selected from the feature vector for the current pixel; obtain an output value of the random forest regression model; and take the output value of the random forest regression model as the haziness for the current pixel.

For example, assuming that the random forest regression model includes 200 regression trees, then 21 dimension feature is randomly selected among the 64 dimension vector from the second fully-connecting layer to train each of the regression trees, and the random forest regression model will output the haziness.

It should be noted that, the training samples used in training the ranking convolutional neural network have ambient light whose R, G and B channels all equal to 1. Hence, before the feature vector for the input hazy image is determined by the ranking convolutional neural network, the input hazy image needs to be normalized by dividing the hazy image by the ambient light for each of the channels, so that the ambient light of the normalized input hazy image is always 1 on each of the R, G and B channels.

When the haziness and ambient light are obtained from the input hazy image using the aforementioned method, the haze-removed clear image $$J(x) = \frac{I(x) - A}{t(x)} + A$$

can be calculated using inverse calculation based on the physics process and mathematical description I(x)=J(x)t(x)+A(1−t(x)) of forming a hazy image, where J(x) represents the clear image, I(x) represents the input hazy image, t(x) represents the haziness, and A represents the ambient light.

Since the clear image J thus obtained is usually less bright, it will need brightness adjustment to produce the final clear image.

Particularly, the adjusting formula is J*=λJ, where $$\lambda = \log\left(\sum_x I^l(x) \Big/ \sum_x J^l(x)\right) + 1, I^l(x)$$

is the brightness of the input hazy image I(x), and $J^l(x)$ is the brightness of the clear image J(x).

Figure 6:
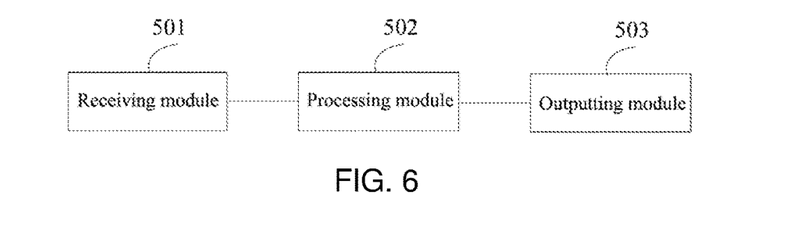
FIG. 6 is a module structural diagram illustrating a ranking convolutional neural network constructing apparatus according to a first embodiment of the present invention.

FIG. 6 is a module structural diagram illustrating a ranking convolutional neural network constructing apparatus according to a first embodiment of the present invention. The ranking convolutional neural network includes a ranking layer, a convolution layer, a downsampling layer and a fully-connecting layer, where the ranking layer is configured to sort an output of a previous layer of the ranking layer, generate an output of the ranking layer according to the sorted output, and output the output of the ranking layer to a next layer of the ranking layer. As depicted in FIG. 6, the apparatus includes:

a receiving module 501 configured to receive an input feature image represented by a two dimensional matrix;

a processing module 502 configured to perform a ranking operation, a convolution operation, a downsampling operation, and a fully-connecting operation to the input feature image, according to a preset order of the ranking layer, the convolution layer, the downsampling layer and the fully-connecting layer in the ranking convolutional neural network to obtain an output feature corresponding to the input feature image, where the output feature is a feature vector, the ranking operation is performed in the ranking layer, the convolution operation is performed in the convolution layer, the downsampling operation is performed in the downsampling layer, and the fully-connecting operation is performed in the fully-connecting layer; and an outputting module 503 configured to output the output feature.

The apparatus is configured to implement the aforementioned method embodiments following similar process and producing similar technical effect, neither of which will be repeated herein.

Figure 7:
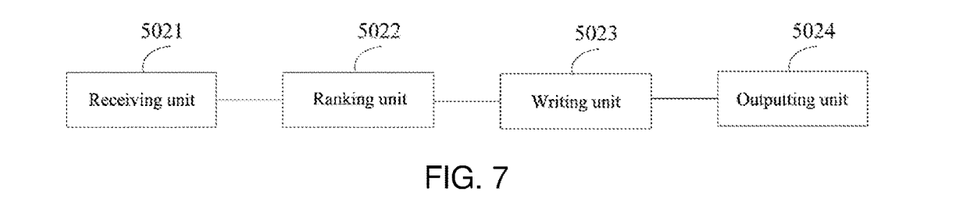
FIG. 7 is a module structural diagram illustrating a ranking convolutional neural network constructing apparatus according to a second embodiment of the present invention.

FIG. 7 is a module structural diagram illustrating a ranking convolutional neural network constructing apparatus according to a second embodiment of the present invention. As depicted in FIG. 7, the processing module 502 includes:

a receiving unit 5021 configured to receive a first feature image output from the previous layer of the ranking layer, where the first feature image is represented by a two dimensional matrix;

a ranking unit 5022 configured to sort all elements in the first feature image;

a writing unit 5023 configured to write each element in the first feature image one-by-one into a second feature image according to a sorted result; and an outputting unit 5024 configured to output the second feature image to the next layer of the ranking layer.

In another embodiment, the ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where a convolution kernel of the second convolution layer is smaller than a convolution kernel of the first convolution layer, and a convolution kernel of the third convolution layer is smaller than the convolution kernel of the first convolution layer.

Figure 8:
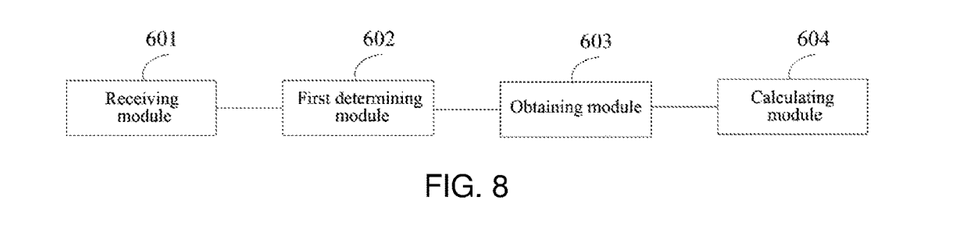
FIG. 8 is a module structural diagram illustrating an image processing apparatus according to a first embodiment of the present invention.

FIG. 8 is a module structural diagram illustrating an image processing apparatus according to a first embodiment of the present invention. As depicted in FIG. 8, the apparatus includes:

a receiving module 601 configured to receive an input hazy image;

a first determining module 602 configured to use a ranking convolutional neural network to determine a feature vector for a current pixel of the input hazy image, where the ranking convolutional neural network includes a ranking layer, a convolution layer, a downsampling layer and a fully-connecting layer, the ranking layer is configured to sort an output of a previous layer of the ranking layer, generate an output of the ranking layer according to the sorted output, and output the output of the ranking layer to a next layer of the ranking layer;

an obtaining module 603 configured to input the feature vector for the current pixel into a random forest regression model to obtain a haziness for the current pixel; and a calculating module 604 configured to calculate a clear image corresponding to the input hazy image according to the haziness and ambient light information.

The apparatus is configured to implement the aforementioned method embodiments following similar process and producing similar technical effect, neither of which will be repeated herein.

Figure 9:
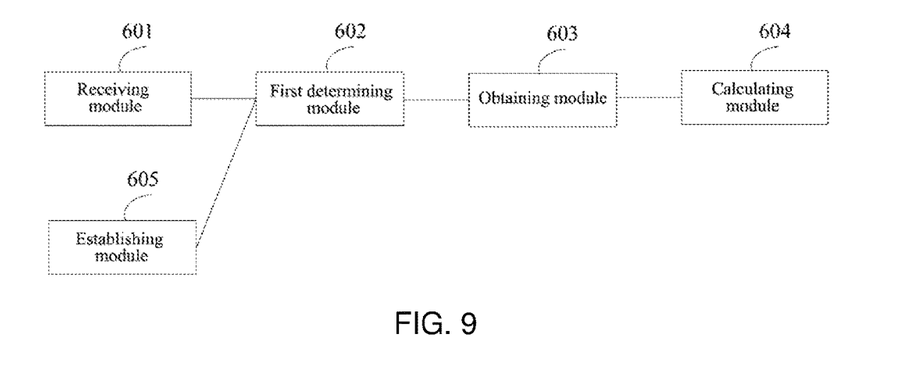
FIG. 9 is a module structural diagram illustrating an image processing apparatus according to a second embodiment of the present invention.

FIG. 9 is a module structural diagram illustrating an image processing apparatus according to a second embodiment of the present invention. As depicted in FIG. 9, on the basis of FIG. 8, the apparatus further includes:

an establishing module 605 configured to establish the correspondence between a feature vector of the output layer and the haziness;

where the correspondence between the feature vector of the output layer and the haziness is: for a feature vector of the output layer $N_B=(n_B^1, n_B^2, L, n_B^m)$, if $t_B \in (i/10-0.1, i/10]$, then $n_B^i=1$, otherwise $n_B^i=0$, where $t_B$ is the haziness.

In another embodiment, the ranking convolutional neural network includes 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, where the output layer is also a fully-connecting layer, a convolution kernel of the second convolution layer is smaller than a convolution kernel of the first convolution layer, and a convolution kernel of the third convolution layer is smaller than the convolution kernel of the first convolution layer.

Figure 10:
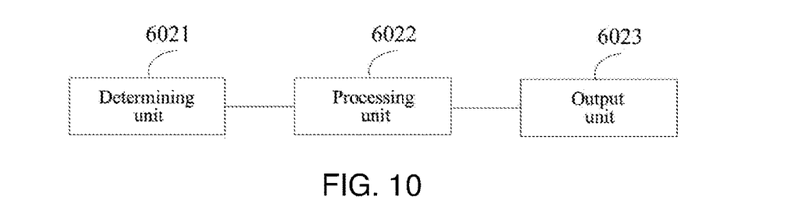
FIG. 10 is a module structural diagram illustrating an image processing apparatus according to a third embodiment of the present invention.

FIG. 10 is a module structural diagram illustrating an image processing apparatus according to a third embodiment of the present invention. As depicted in FIG. 10, based on the aforementioned 10-layer ranking convolutional neural network, the first determining module 602 includes:

a determining unit 6021 configured to determine an input feature image for the current pixel through the input layer, where the input feature image is represented by a two dimensional matrix;

a processing unit 6022 configured to perform ranking, convoluting, downsampling and fully-connecting for the input feature image; and an output unit 6023 configured to take a feature vector output by the second fully-connecting layer as the feature vector for the current pixel.

In another embodiment, the obtaining module 603 is particularly configured to:

train a regression tree in the random forest regression model using a preset number of elements selected from the feature vector for the current pixel; obtain an output value of the random forest regression model; and take the output value of the random forest regression model as the haziness for the current pixel.

Figure 11:
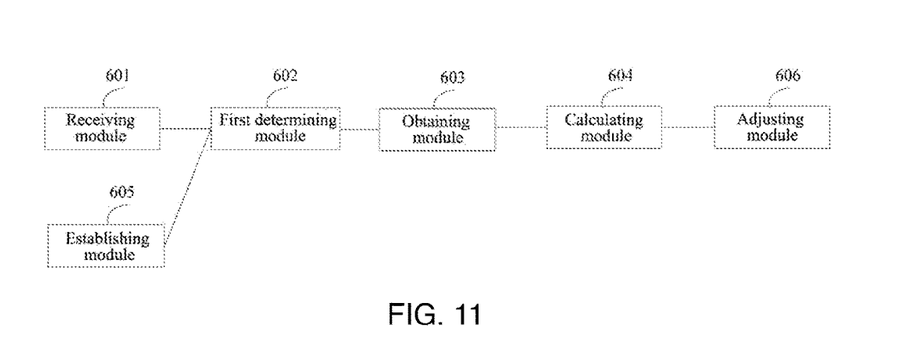
FIG. 11 is a module structural diagram illustrating an image processing apparatus according to a forth embodiment of the present invention.

FIG. 11 is a module structural diagram illustrating an image processing apparatus according to a forth embodiment of the present invention. As depicted in FIG. 11, on the basis of FIG. 9, the apparatus further includes:

an adjusting module 606 configured to adjust brightness of the clear image using formula J*=λJ, where $$\lambda = \log\left(\sum_x I^l(x) \Big/ \sum_x J^l(x)\right) + 1, I^l(x)$$

is brightness of the input hazy image, and $J^l(x)$ is the brightness of the clear image.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disc.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. An image dehazing method, comprising:
receiving an input hazy image;
determining, by using a ranking convolutional neural network, a feature vector for a current pixel of the input hazy image, wherein the ranking convolutional neural network comprises a ranking layer, a convolution layer, a downsampling layer and a fully-connecting layer, the ranking layer is configured to sort an output of a previous layer of the ranking layer, generate an output of the ranking layer according to the sorted output, and output the output of the ranking layer to a next layer of the ranking layer;
inputting the feature vector for the current pixel into a random forest regression model to obtain a haziness for the current pixel; and
determining a clear image corresponding to the input hazy image according to the haziness and ambient light information.

2. The method according to claim 1, before the determining, by using a ranking convolutional neural network, a feature vector for a current pixel of the input hazy image, further comprising:
establishing correspondence between a feature vector of an output layer and the haziness;
wherein the correspondence between the feature vector of the output layer and the haziness is: for the feature vector of the output layer $N_B=(n_B^1, n_B^2, \ldots, n_B^m)$, if $t_B \in (i/10-0.1, i/10]$, then $n_B^i=1$, otherwise $n_B^i=0$, wherein $t_B$ is the haziness.

3. The method according to claim 1, wherein the ranking convolutional neural network comprises 10 layers that are, in order: an input layer, a first convolution layer, a first downsampling layer, the ranking layer, a second convolution layer, a third convolution layer, a second downsampling layer, a first fully-connecting layer, a second fully-connecting layer and an output layer, wherein a convolution kernel of the second convolution layer is smaller than a convolution kernel of the first convolution layer, and a convolution kernel of the third convolution layer is smaller than the convolution kernel of the first convolution layer;
the determining, by using a ranking convolutional neural network, a feature vector for a current pixel of the input hazy image comprises:
determining an input feature image for the current pixel through the input layer, wherein the input feature image is represented by a two dimensional matrix;
performing ranking, convoluting, downsampling and fully-connecting for the input feature image; and
taking a feature vector output by the second fully-connecting layer as the feature vector for the current pixel.

4. The method according claim 1, wherein the inputting the feature vector for the current pixel into a random forest regression model to obtain a haziness for the current pixel comprises:
training a regression tree in the random forest regression model using a preset number of elements selected from the feature vector for the current pixel; obtaining an output value of the random forest regression model; and taking the output value of the random forest regression model as the haziness for the current pixel.

5. The method according claim 1, after the determining a clear image corresponding to the input hazy image according to the haziness and ambient light information, further comprising:
adjusting brightness of the clear image using formula J*λJ, wherein $$\lambda = \log\left(\sum_x I^l(x) \Big/ \sum_x J^l(x)\right) + 1, I^l(x)$$

is brightness of the input hazy image, and $J^l(x)$ is the brightness of the clear image.

* * * * *